UNITED STATES PATENT OFFICE.

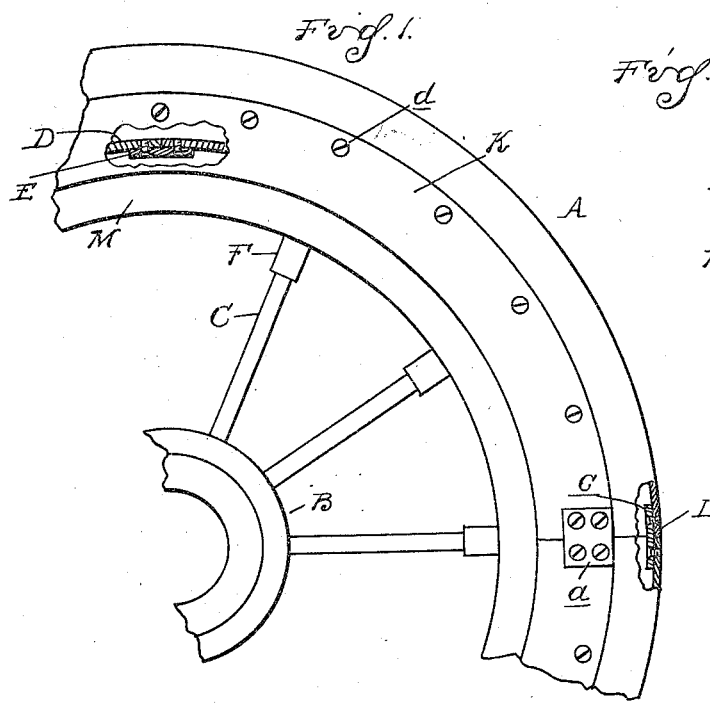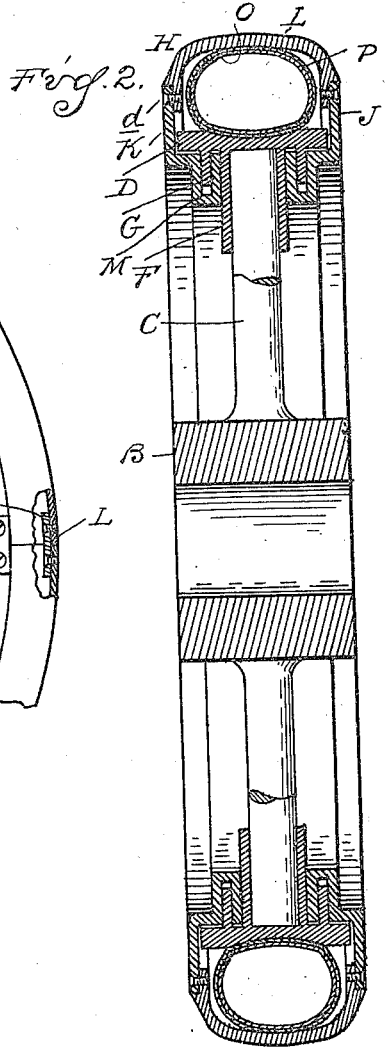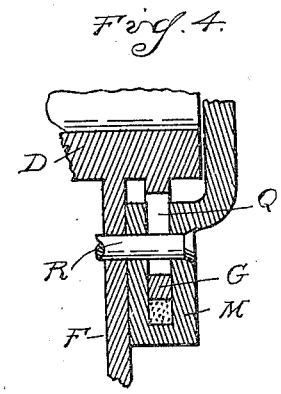

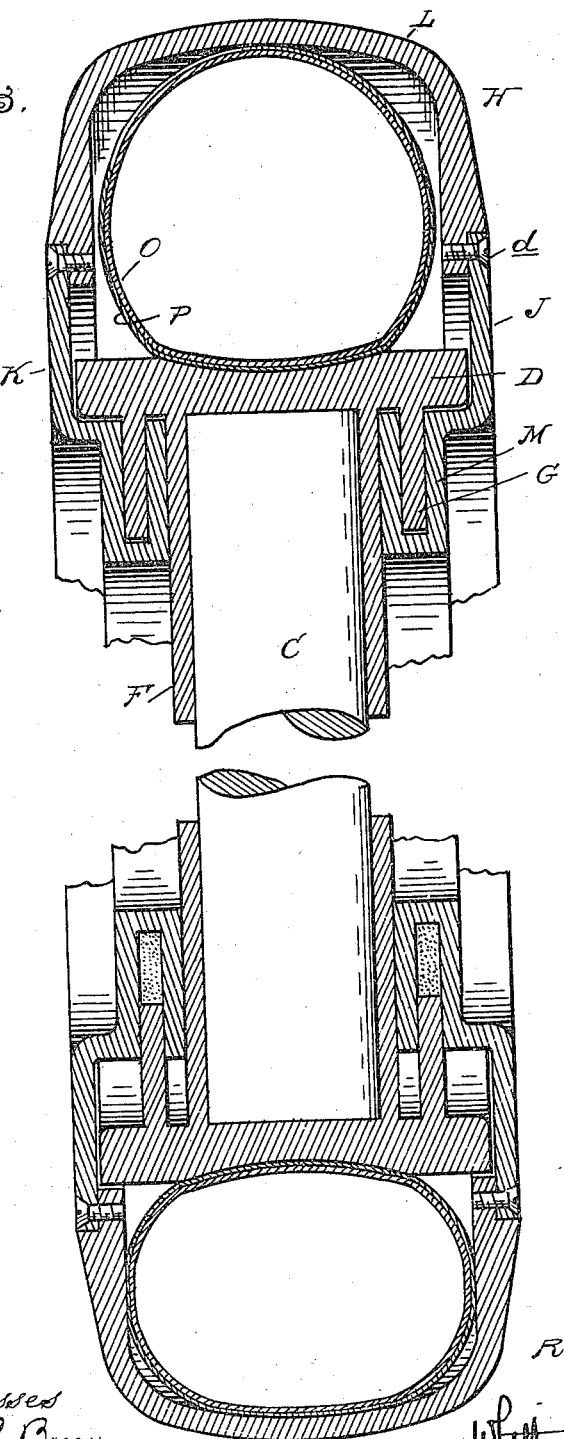

RALPH R. SANDHAM, OF HARLAN, IOWA, ASSIGNOR, BY MESNE ASSIGNMENTS, OF ONE-HALF TO JOSIAH D. SANDHAM, OF OMAHA, NEBRASKA.

WHEEL.

948,978.  Specification of Letters Patent.  Patented Feb. 8, 1910.

Application filed July 18, 1907. Serial No. 384,330.

*To all whom it may concern:*

Be it known that I, RALPH R. SANDHAM, a citizen of the United States of America, residing at Harlan, in the county of Shelby and State of Iowa, have invented certain new and useful Improvements in Wheels, of which the following is a specification, reference being had therein to the accompanying drawings.

The invention relates generally to vehicle wheels, and particularly to a tire therefor so constructed as to be puncture-proof and protected against blow-outs and rim cuts, and at the same time possess the desired resiliency of the ordinary pneumatic tire.

The invention consists in the construction of the tire and in the peculiar arrangement and combination of its various parts, as more fully hereinafter set forth.

In the drawings,—Figure 1 is a view in side elevation of a portion of a vehicle wheel, with my improved tire applied thereto; Fig. 2 is a vertical central section through the wheel and tire; Fig. 3 is a similar view, showing the parts of the tire when under compression; and Fig. 4 is an enlarged sectional view, illustrating the means employed for preventing independent rotation of the parts.

In the drawings thus briefly described, A designates the wheel proper, consisting of a hub B, spokes C, and a rim D, the parts being united into a rigid structure. The rim is formed in complementary sections, united at their meeting ends by fish-plates E, and each section is provided with a series of socket sections F adapted to receive the spoke ends, and complementary and semi-circular flanges G extending inwardly from the inner face of the rim, as plainly shown on the drawings.

H represents the tread member of the tire, composed of complementary circular side sections J and K and a tread section proper L, the parts being so proportioned and united as to form a housing inclosing the rim and extending therebeyond for a purpose hereinafter set forth. Each side section of the tread is formed of two complementary parts, united in any suitable manner, as by fish-plates a, and each carries a depending socket section, as M, the socket portions when the parts are assembled being continuous and adapted to receive the flanges G on the rim, the flanges in turn being adapted to slide easily within the sockets, permitting the tread member to move radially in relation to the wheel proper. The tread section L is made preferably of metal, and is formed in two complementary sections which are united at their meeting ends by fish-plates c, and are detachably connected to the side sections J and K by a series of fastening devices, as screws d.

Arranged within the housing formed by the tread and rim sections of the wheel is a yielding abutment O in the form of a pneumatic tube so fashioned that when interposed between the tread and rim, as shown in the drawings, it will be held normally by the parts—when the tire is not under compression—in elliptical form.

The tube if desired may be provided with an outer covering or jacket, as for instance leather, designated by the reference-letter P.

From the construction as set forth, it will be seen that the tire is capable of radial movement relative to the wheel, and that owing to the peculiar form of the tubing used in the housing the yielding abutment is at all times in contact with the tire parts, as when the tube is compressed at one point of its circumference which is reinforced it is capable of elongation radially at a diametrically-opposite point. Thus, the tread is prevented from leaving the abutment, and the consequent shock and jar from again contacting therewith is obviated.

For the purpose of preventing independent rotation of the tire parts, and at the same time permitting the relative radial movement desired, I preferably form a circular opening, as Q, in one of the flanges G of the rim, and extend therethrough and through the adjoining portion of the socket section M of the tread section a pin R. This permits but a slight relative rotation between the parts, and at the same time permits the full radial movement at any portion of the circumference of the tire.

From the construction described, it will be noticed that the road shocks received at any point in the circumference of the tire are transmitted to a diametrically-opposite point independently of the wheel proper, so that the wheel structure and the vehicle supported thereby is freed from all jolts or shocks to an even greater extent than could be obtained by the use of the ordinary pneumatic tire. Further, any jolting resulting from the striking between the tire parts themselves is prevented by reason of the radial elongation of the abutment, and the resulting constant contact of the tubing with the tread and rim sections; and still further, the tubing itself is entirely inclosed and thus protected from puncture, rim cuts, and the like.

To permit the ready radial movement of the tread, I preferably fill the socket sections M of the side members with an oil or grease of sufficient density to prevent its running out of the socket. This serves to lubricate the engaging parts and permits the sliding movement.

What I claim as my invention is,—

1. In a wheel, the combination with a rim carrying laterally spaced inwardly extending members, of a tread section comprising complementary sides and a tread proper spaced from the rim, the sides being provided each with an annular opening to receive the corresponding rim member, and a pneumatic tube interposed between the rim and tread.

2. In a wheel, the combination with a rim carrying laterally spaced inwardly extending annular flanges, of a hollow tread section comprising complementary sectional sides and a detachable tread portion spaced from the rim, annular socket sections carried by the sides with which the rim flanges engage, means for preventing independent rotary movement between the rim and tread section, and a pneumatic tube housed within the tread section.

3. In a wheel, the combination with a rim carrying spaced inwardly projecting annular flanges and spoke-receiving sockets intermediate of the flanges, of a hollow tread section composed of sectional side members and a detachable tread portion, annular socket sections carried by the sides within which the rim flanges extend, means for preventing independent rotary movement between the rim and tread section, and a pneumatic tube housed within the tread section.

In testimony whereof I affix my signature in presence of two witnesses.

RALPH R. SANDHAM.

Witnesses:
 A. L. Foster,
 F. R. Lintleman.